(12) United States Patent
Krakhman

(10) Patent No.: US 11,255,710 B2
(45) Date of Patent: Feb. 22, 2022

(54) MASS FLOW METERS/CONTROLLERS AND METHODS HAVING IMPROVED ACCURACY

(71) Applicant: Illinois Tool Works Inc., Glenview, IL (US)

(72) Inventor: Vladimir Krakhman, Chalfont, PA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/870,147

(22) Filed: May 8, 2020

(65) Prior Publication Data
US 2021/0348958 A1 Nov. 11, 2021

(51) Int. Cl.
*G01F 1/84* (2006.01)
(52) U.S. Cl.
CPC .......... *G01F 1/8427* (2013.01); *G01F 1/8468* (2013.01)
(58) Field of Classification Search
CPC .................................................... G01F 1/8427
See application file for complete search history.

(56) References Cited

U.S. PATENT DOCUMENTS

2005/0150311 A1 7/2005 Berger
2010/0094570 A1\* 4/2010 Gonia .................... G01F 15/063
   702/49
2010/0122585 A1\* 5/2010 Brouwer ............... G01F 1/8427
   73/861.357
2018/0113014 A1\* 4/2018 Singer ................... G01F 1/8427

FOREIGN PATENT DOCUMENTS

EP 1923675 5/2008
JP S58206924 12/1983

OTHER PUBLICATIONS

Int'l Search Report and Written Opinion Appln No. PCT/US2021/023681 dated Jun. 22, 2021.

\* cited by examiner

*Primary Examiner* — Paul M. West
*Assistant Examiner* — Mark A Shabman
(74) *Attorney, Agent, or Firm* — McAndrews, Held & Malloy, Ltd.

(57) ABSTRACT

A disclosed mass flow meter/controller includes: a flow tube to direct a fluid from an inlet of the flow tube to an outlet of the flow tube; an actuator to cause a vibration in the flow tube; a light source to emit light; at least one beam splitter to split the light emitted by the light source into a first light beam and a second light beam; a first optical sensor to output first measurements of a first position of a first location on the flow tube based on detecting the first light beam; a second optical sensor to output second measurements of a second position of a second location on the flow tube based on detecting the second light beam; and control circuitry to determine a mass flow rate and/or a density of the fluid in the flow tube based on the first and second measurements.

18 Claims, 6 Drawing Sheets

MASS FLOW METERS/CONTROLLERS AND METHODS HAVING IMPROVED ACCURACY

BACKGROUND

This disclosure relates generally to mass flow measurement and control and, more particularly, to mass flow meters/controllers and methods having improved accuracy.

Coriolis effect-based mass flow meters measure mass flow of media by determining a phase difference between different portions of a flow tube through which the media flows.

SUMMARY

Mass flow meters/controllers having improved accuracy, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
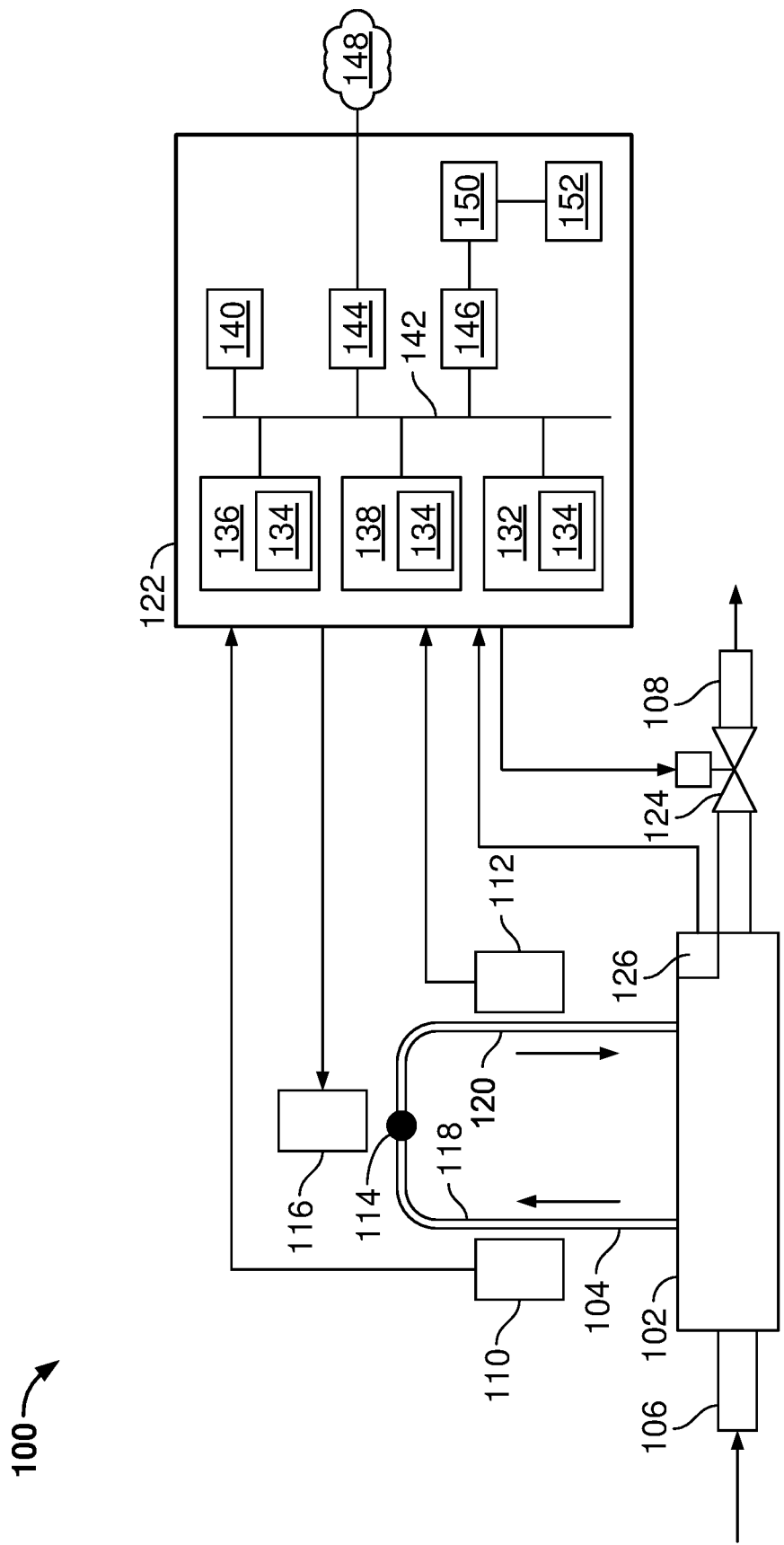
FIG. 1 is a schematic diagram of an example mass flow meter/controller, in accordance with aspects of this disclosure.

The accuracy of mass flow measurement is dependent on the quality of the signals output by the optical sensors. In conventional optical sensors for Coriolis mass flow meters, a separate light source (e.g., a channel) provides a light beam for measurement by the respective optical sensor. Optical sensors in the conventional arrangement output signals include a DC bias signal and an AC signal due to flow tube modulation. In convention mass flow meters having multiple optical channels, in which each optical channel includes a light source, a light source control circuit, and an optical sensor, each component of a given channel also generates a noise, which affects the total optical channel output signal. For example, each optical channel optical channel may include a photo sensor noise signal due to the light source control circuit, a photo sensor noise signal due to the light source, and a AC noise signal due to the photo sensor.

Because the noise sources mentioned above are random noise with no correlation between them, these noise signals cannot be compensated and adversely impact flow meter accuracy in conventional flow meters. Therefore, for conventional mass flow meters, having two separate channels, there are at least six independent variables contributing some noise to total phase shift value.

Disclosed example mass flow meters/controllers reduce the number of independent noise sources in the mass flow measurements, thereby increasing the accuracy. In some disclosed examples, one or more beam splitters split a single source of light for use by multiple channels, and direct the resulting light beams to traverse different locations on the flow tube for measurement of the phase difference between the locations.

Disclosed example mass flow meters/controllers include: a flow tube configured to direct a fluid from an inlet of the flow tube to an outlet of the flow tube; an actuator configured to cause a vibration in the flow tube; a light source configured to emit light; at least one beam splitter configured to split the light emitted by the light source into a first light beam and a second light beam; a first optical sensor configured to output first measurements of a first position of a first location on the flow tube based on detecting the first light beam; a second optical sensor configured to output second measurements of a second position of a second location on the flow tube based on detecting the second light beam; and control circuitry configured to determine at least one of a mass flow rate through the flow tube or a density of the fluid in the flow tube based on the first measurements and the second measurements.

In some example mass flow meters/controllers, the at least one beam splitter is configured to direct the first light beam and the second light beam in opposite directions, and the first optical sensor and the second optical sensor are positioned on opposite sides of the at least one beam splitter to receive the first light beam and the second light beam, respectively, from the at least one beam splitter. In some examples, the at least one beam splitter includes: a first mirror arranged at substantially a 45 degree angle to the light source to reflect a first portion of the light from the light source to form the first light beam; and a second mirror arranged to reflect a second portion of light from the light source that passes through the first mirror back toward the first mirror. The first mirror is configured to reflect the second portion of the light from the second mirror to form the second light beam.

In some example mass flow meters/controllers, the at least one beam splitter further includes a third mirror configured to reflect the first light beam from the first mirror to the first optical sensor, and a fourth mirror configured to reflect the second light beam from the first mirror to the second optical sensor. Some example mass flow meters/controllers further include a printed circuit board, in which the first optical sensor and the second optical sensor are mounted to the printed circuit board. In some example mass flow meters/controllers, the printed circuit board is configured to thermally couple the first optical sensor and the second optical sensor. In some example mass flow meters/controllers, the light source is mounted to the printed circuit board and is thermally coupled to the first optical sensor and the second optical sensor.

In some example mass flow meters/controllers, the first location of the flow tube, the second location of the flow tube, and a portion of the flow tube between the first location and the second location are oriented on a two-dimensional plane, and the actuator is configured to cause the vibration in the flow tube in a direction along the two-dimensional plane. In some example mass flow meters/controllers, the first location of the flow tube, the second location of the flow tube, and a portion of the flow tube between the first location and the second location are oriented on a two-dimensional plane, and the actuator is configured to cause the vibration in the flow tube in a direction transverse to the two-dimensional plane.

In some example mass flow meters/controllers, the at least one beam splitter comprises at least one of a cube beam splitter, a plate beam splitter, a pellicle beam splitter, a Wollaston prism, a diffractive beam splitter, an actuated beam splitter, or a fused fiber beam splitter. In some example mass flow meters/controllers, the actuator includes a driving coil configured to actuate the flow tube via a magnet attached to the flow tube. Some example mass flow meters/controllers further include a flow control valve configured to control a flow of the fluid through the flow tube, in which the control circuitry is configured to control the flow control valve based on the determined mass flow rate.

Disclosed example methods involve: directing a fluid from an inlet of a flow tube to an outlet of the flow tube; causing a vibration in the flow tube via an actuator; emitting light from a light source; splitting, via at least one beam splitter, the light emitted by the light source into a first light beam and a second light beam; outputting, via a first optical sensor, first measurements of a first position of a first location on the flow tube based on detecting the first light beam; outputting, via a second optical sensor, second measurements of a second position of a second location on the flow tube based on detecting the second light beam; and determining, via control circuitry, at least one of a mass flow rate through the flow tube or a density of the fluid in the flow tube based on the first measurements and the second measurements.

In some example methods, splitting the light via the at least one beam splitter involves: reflecting a first portion of the light from the light source, via a first mirror arranged at substantially a 45 degree angle to the light source, to form the first light beam; reflecting a second portion of light from the light source that passes through the first mirror back toward the first mirror via a second mirror; and reflecting the second portion of the light from the light source via the first mirror to form the second light beam.

Some example methods further involve directing the first light beam and the second light beam in opposite directions. Some example methods further involve reflecting the first light beam via the first mirror to the first optical sensor via a second mirror and reflecting the second light beam reflected via the first mirror to the second optical sensor. Some example methods further involve thermally coupling the first optical sensor and the second optical sensor. Some example methods further involve thermally coupling the light source to the first optical sensor and the second optical sensor.

In some examples, splitting the light involves splitting the light using at least one of a cube beam splitter, a plate beam splitter, a pellicle beam splitter, a Wollaston prism, a diffractive beam splitter, an actuated beam splitter, or a fused fiber beam splitter. In some example methods, causing the vibration in the flow tube comprises actuating the flow tube via a magnet and a driving coil.

FIG. 1 is a schematic diagram of an example mass flow meter/controller 100. The example mass flow meter/controller 100 of FIG. 1 may be used to measure mass flow and/or density of a fluid through a conduit connected in line with the mass flow meter/controller 100, and/or to control mass flow of a fluid through the conduit by controlling a valve.

The example mass flow meter/controller 100 includes a flow-through base 102, a flow tube 104, a fluid inlet 106, and a fluid outlet 108. The flow tube 104 directs a fluid from the fluid inlet 106 of the flow tube 104 to the fluid outlet 108 of the flow tube 104. To measure mass flow and/or density of the fluid flowing through the flow tube 104, the example mass flow meter/controller 100 includes multiple optical sensors 110, 112 (also referred to herein as "photo sensors"), an actuator to cause vibration in the flow tube 104 (e.g., a permanent magnet 114 and a driving coil 116), and control circuitry 122. To reduce measurement error, the example mass flow meter/controller 100 further includes a temperature sensor 126.

The flow tube 104 is configured in a U-shape. The driving coil 116 generates an alternating magnetic field, which creates a driving force on the permanent magnet 114, which is attached to the flow tube 104 and transfers the driving force to the flow tube 104 to result in a vibration in the flow tube 104. The flow tube 104 vibrates at a frequency, and the control circuitry 122 may control the driving coil 116 to cause the vibration frequency to approximate the natural oscillation frequency of the flow tube 104. Moving media (e.g., gas or liquid) inside the flow tube 104 creates a Coriolis force, which causes a phase shift between a first location 118 on the flow tube 104 that is upstream of the actuator and a second location 120 on the flow tube 104 that is downstream of the actuator. The optical sensors 110, 112 measure the positions of the flow tube 104 at the first and second locations 118, 120 and output respective signals (e.g., measurements) having the same frequency, but having a phase or time difference.

The example control circuitry 122 determines a mass flow rate through the flow tube 104 and/or a density of the fluid in the flow tube 104 based on first measurements from the optical sensor 110 and second measurements from the optical sensor 112. In some examples, the control circuitry 122 controls a mass flow rate through the flow tube 104 using a flow control valve 124. The control circuitry 122 may control the flow control valve 124 based on a comparison of a desired flow rate and the measured flow rate, and may include one or more control loops and/or filters such as a proportional-integral-derivative (PID) controller.

The example control circuitry 122 of FIG. 1 may be a general-purpose computer, a laptop computer, a tablet computer, a mobile device, a server, an embedded device, and/or any other type of computing device.

The example control circuitry 122 of FIG. 1 includes a processor 132. The example processor 132 may be any general purpose central processing unit (CPU) from any manufacturer. In some other examples, the processor 132 may include one or more specialized processing units, such as graphic processing units and/or digital signal processors. The processor 132 executes machine readable instructions 134 that may be stored locally at the processor (e.g., in an included cache), in a random access memory 136 (or other volatile memory), in a read only memory 138 (or other non-volatile memory such as FLASH memory), and/or in a mass storage device 140. The example mass storage device 140 may be a hard drive, a solid state storage drive, a hybrid drive, a RAID array, and/or any other mass data storage device.

A bus 142 enables communications between the processor 132, the RAM 136, the ROM 138, the mass storage device 140, a network interface 144, and/or an input/output interface 146.

The example network interface 144 includes hardware, firmware, and/or software to connect the control circuitry 122 to a communications network 148 such as the Internet. For example, the network interface 144 may include IEEE 802.X-compliant wireless and/or wired communications hardware for transmitting and/or receiving communications.

The example control circuitry 122 may access a non-transitory machine readable medium 152 via the I/O interface 146 and/or the I/O device(s) 150. Examples of the machine readable medium 152 of FIG. 1 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

To determine the mass flow rate, the example control circuitry 122 may use the mass flow equation shown in Equation 1 below:

$$MF = FCF \ast \Delta t \quad \text{(Equation 1)}$$

In Equation 1, MF is the mass flow (e.g., kilograms/second (kg/s), FCF is the flow calibration factor, which is a constant for a specific device (e.g., based on a calibration), and $$\Delta t = \frac{\theta}{2\pi F},$$

in which Θ is the phase difference between the output signals from the optical sensors 110, 112, and F is the natural oscillation frequency of the flow tube 104.

Figure 2:
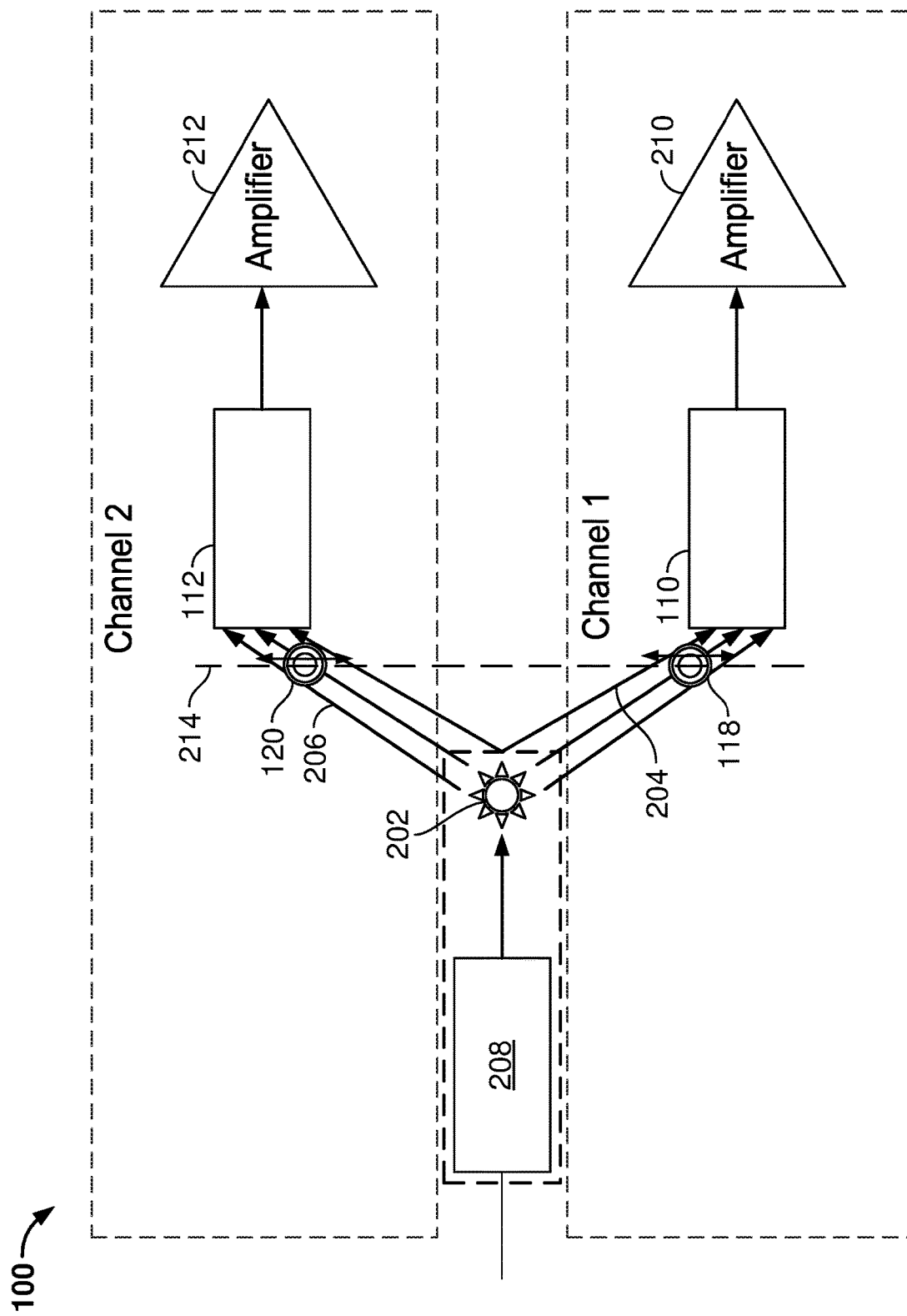
FIG. 2 is a schematic diagram of an example implementation of the mass flow meter/controller of FIG. 1, in which a single light source provides multiple light beams for detection by multiple optical sensors.

FIG. 2 is a schematic diagram of an example implementation of the mass flow meter/controller 100 of FIG. 1, in which a single light source 202 (e.g., an LED) provides multiple light beams 204, 206 for detection by the optical sensors 110, 112. The light source 202 is controlled by a light source controller 208. By reducing the number of light sources to one, the example of FIG. 2 reduces the number of independent noise or error sources in the measurement and increases the accuracy of the mass flow and/or density measurement(s). The optical sensors 110, 112 output the resulting signals to respective amplifiers 210, 212, which may be implemented in the control circuitry 122 of FIG. 1.

To direct multiple light beams 204, 206 from the same light source 202 to two different optical sensors 110, 112 such that the optical sensors 110, 112 are capable of measuring the vibration of the flow tube 104 via the light beams 204, 206, the light source 202 may be configured to emit light in multiple directions. Additionally or alternatively, as discussed in more detail below, the mass flow meter/controller may include one or more beam splitters and/or the optical sensors 110, 112 may be configured to output measurements of the positions of the first and second locations 118, 120 on the flow tube 104 based on detecting multiple light beams generated using the single light source 202.

Figure 3:
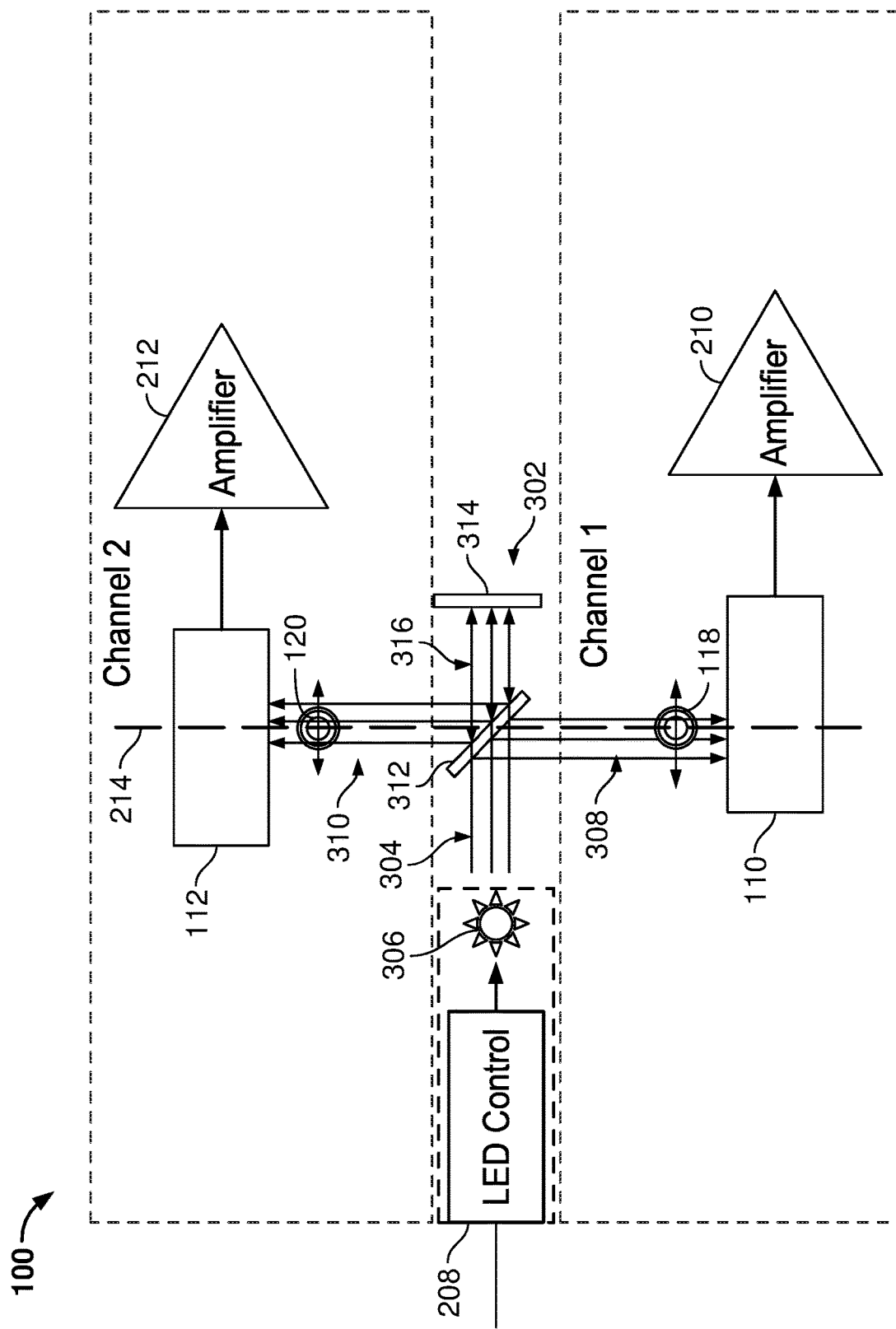
FIG. 3 is a schematic diagram of an example implementation of the mass flow meter/controller of FIG. 1, including one or more beam splitters to split light output by a single light source into multiple light beams for detection by multiple optical sensors.

FIG. 3 is a schematic diagram of another example implementation of the mass flow meter/controller 100 of FIG. 1, including a beam splitter 302 to split light 304 output by a single light source 306 into multiple light beams 308, 310 for detection by the optical sensors 110, 112.

The example beam splitter 302 of FIG. 3 includes a first mirror 312 oriented at a 45 degree angle to the light 304 from the light source 306. The first mirror 312 reflects a first portion of the light 304 from the light source 306 to form the first light beam 308, and directs the first light beam 308 toward the first optical sensor 110. The first location 118 on the flow tube 104 is positioned between the first mirror 312 and the optical sensor 110, such that the first location 118 of the flow tube 104 occludes a portion of the first light beam 308 based on the vibration of the flow tube 104.

The beam splitter 302 includes a second mirror 314 that reflects a second portion 316 of the light 304 from the light source 306 that passes through the first mirror 312 back toward the first mirror 312. The first mirror 312 reflects the second portion 316 of the light from the second mirror 314 to form the second light beam 310, and directs the second light beam 310 toward the second optical sensor 112. The second location 120 on the flow tube 104 is positioned between the first mirror 312 and the optical sensor 112, such that the second location 120 of the flow tube 104 occludes a portion of the second light beam 310 based on the vibration of the flow tube 104.

The beam splitter (e.g., mirrors 312, 314) are configured to direct the first light beam 308 and the second light beam 310 in opposite directions, and the first optical sensor 110 and the second optical sensor 112 are positioned on opposite sides of the beam splitter to receive the first light beam 308 and the second light beam 310, respectively, from the at least one beam splitter (e.g., from mirrors 312, 314).

In contrast to the conventional Coriolis mass flow meters discussed above, the example flow meter of FIG. 3 has a reduced phase noise. Because only one light source 306 is used for both channels (e.g., both optical sensors 110, 112) the noise contributions to each channel from the light source 306 and the light source controller 208 are not independent, because the noise contributions are generated by the same components (e.g., the light source 306 and the light source controller 208) for both channels, and can be compensated by the control circuitry 122. As a result, the disclosed example mass flow meter of FIG. 3 reduces the number of noise contributors from six to two and improves the measurement accuracy of the example mass flow meter over the conventional mass flow meters.

Figure 4:
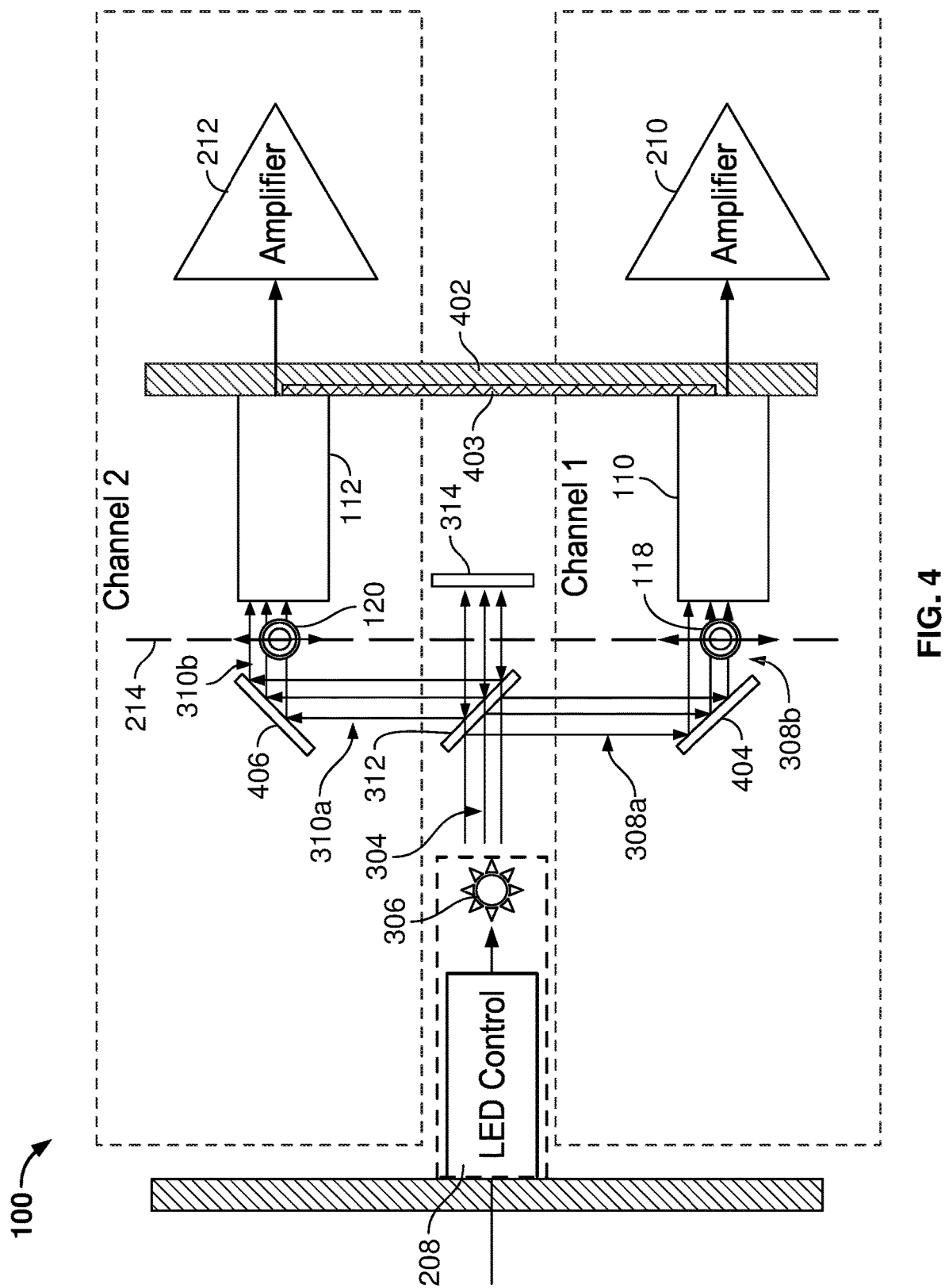
FIG. 4 is a schematic diagram of an example implementation of the mass flow meter/controller of FIG. 1, including one or more beam splitters to split light output by a single light source into multiple light beams for detection by multiple optical sensors, and in which split light beams have the same direction as the light source.

FIG. 4 is a schematic diagram of an example implementation of the mass flow meter/controller 100 of FIG. 1, including one or more beam splitters (e.g., mirrors 312, 314) to split light 304 output by a single light source 306 into multiple light beams 308, 310 for detection by multiple optical sensors 110, 112.

In the example of FIG. 4, the optical sensors 110, 112 are thermally coupled to each other via a printed circuit board 402. That is, the optical sensors 110, 112 are coupled to the same printed circuit board 402, and the printed circuit board 402 further includes a path of thermally conductive material 403 (e.g., a strip of copper, aluminum, etc.) coupling the optical sensors 110, 112. Because the optical sensors 110, 112 have some parameters dependent on temperature, temperature differences between the optical sensors 110, 112 may create a difference in output signal and additional phase error. The example printed circuit board 402 reduces temperature-dependent phase errors in the optical sensors 110, 112 by closely locating the optical sensors 110, 112, and thereby reducing or substantially eliminating temperature gradients between the optical sensors 110, 112.

Instead of being mounted on opposite sides of the flow tube 104 from the mirror 312, the example optical sensors 110, 112 are mounted on the circuit board 402. A third mirror 404 is configured at a 45 degree angle to the first light beam 308a to reflect the first light beam 308a from the first mirror 312 to the first optical sensor 110. A fourth mirror 406 is configured at a 45 degree angle to the second light beam 310a to reflect the second light beam 310a from the first mirror 312 to the second optical sensor 112. Both mirrors 404, 406 reflect almost all incident light (e.g., the first and second light beams 308a, 308b, 310a, 310b) 90 degrees, and direct the light beams 308a, 308b, 310a, 310b toward the optical sensors 110, 112 such that the light beams 308b, 310b incident on the optical sensors 110, 112 are traveling in the same direction (e.g., 0 degrees relative to the emitted light 304 generated by the light source 306).

Figure 5:
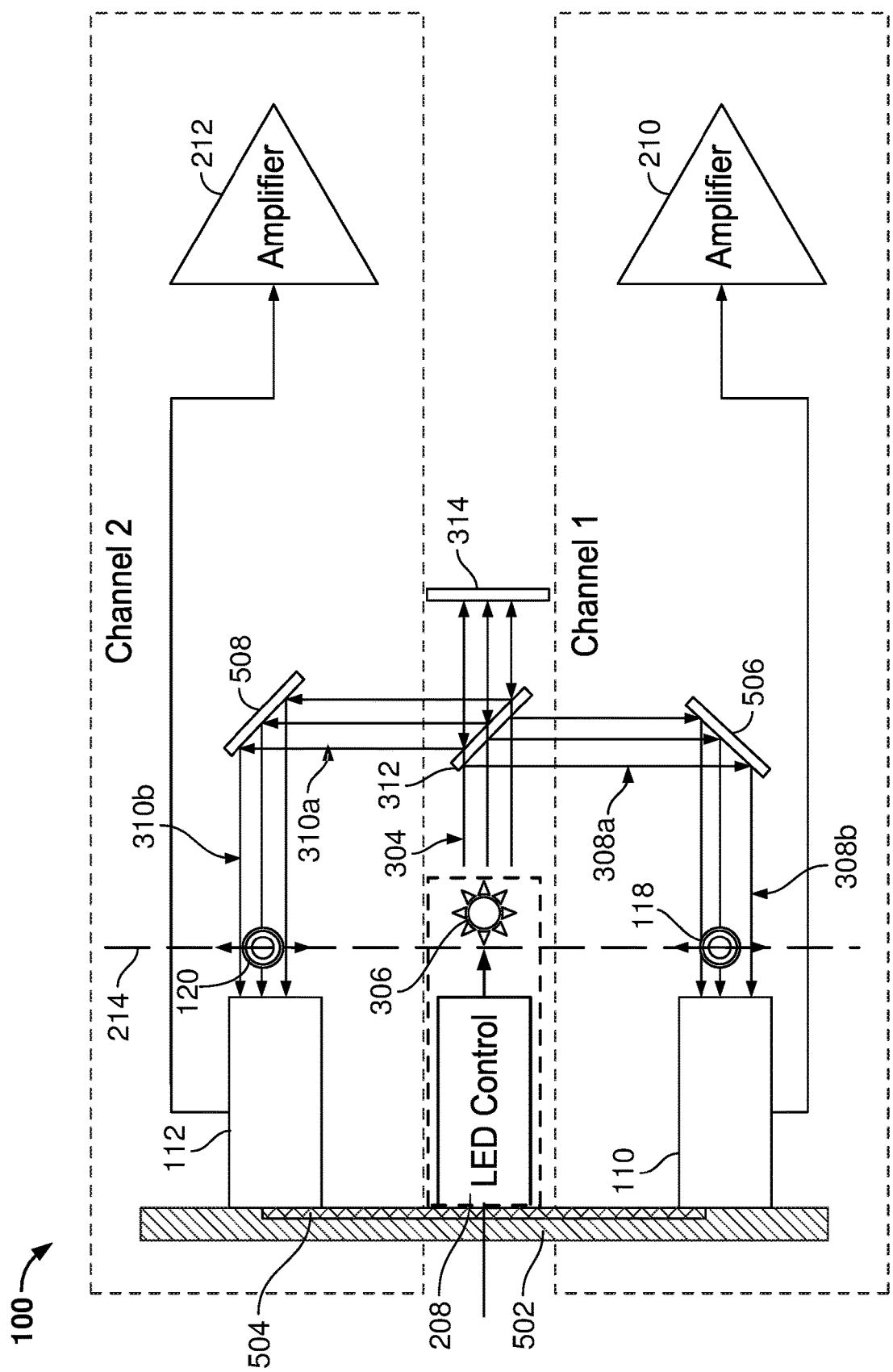
FIG. 5 is a schematic diagram of an example implementation of the mass flow meter/controller of FIG. 1, including one or more beam splitters to split light output by a single light source into multiple light beams for detection by multiple optical sensors, and in which split light beams have an opposite direction as the light source.

In the example of FIG. 4, the direction of vibration of the flow tube 104 is a different direction than the example of FIG. 3. The first location 118 on the flow tube 104, the second location 120 on the flow tube 104, and a portion of the flow tube 104 between the first location 118 and the second location 120 (e.g., the U-shaped portion of the flow tube 104) are oriented on a two-dimensional plane 214 as illustrated in FIGS. 2-5. In the example of FIG. 3, the direction of vibration of the flow tube 104 is transverse to the plane 214, while the direction of vibration in the examples of FIGS. 2, 4 and 5 are within the plane 214. The actuator (e.g., the driving coil 116 and/or the magnet 114) are configured to obtain the direction of vibration based on the arrangement of the optical sensors 110, 112 and the light beams 308, 310 relative to the flow tube 104.

In the example of FIG. 4, the light source 306 and/or the light source controller 208 are coupled to a second printed circuit board 408 that is separate from the printed circuit board 402. In the example of FIG. 4, the optical sensors 110, 112 may be physically separated from the light source 306 and the light source controller 208. A temperature difference may occur between the optical sensors 110, 112 and the light source 306 and the light source controller 208 due to the physical separation, which can result in a difference in output signal, additional phase error, and a loss in measurement accuracy. FIG. 5 is a schematic diagram of an example implementation of the mass flow meter/controller 100 of FIG. 1, including one or more beam splitters (e.g., the mirrors 312, 314) to split the light 304 output by the single light source 306 into multiple light beams 308, 310 for detection by multiple optical sensors 110, 112. In the example of FIG. 5, the optical sensors 110, 112, the light source 306, and the light source controller 208 are thermally coupled to each other via a printed circuit board 502.

Because the optical sensors 110, 112, the light source 306, and the light source controller 208 have some parameters dependent on temperature, temperature differences between the optical sensors 110, 112 may create a difference in output signal and additional phase error. The example printed circuit board 502 includes a path of thermally conductive material 504 (e.g., a strip of copper, aluminum, etc.) coupling the optical sensors 110, 112, the light source 306, and the light source controller 208. The example arrangement of the optical sensors 110, 112, the light source 306, and the light source controller 208 in FIG. 5 reduces temperature-dependent phase errors in the optical sensors 110, 112, the light source 306, and the light source controller 208 by closely locating the components and thereby reducing or substantially eliminating temperature gradients between the components.

To enable the single light source 306 to provide the light beams 308, 310 to the optical sensors 110, 112 located on the same printed circuit board 502, in a way that causes the light beams 308a, 308b, 310a, 310b to traverse the flow tube 104, the example of FIG. 5 includes a third mirror 506 and a fourth mirror 508. The third mirror 506 is configured at a 45 degree angle to the first light beam 308a to reflect the first light beam 308a from the first mirror 312 to the first optical sensor 110. The fourth mirror 508 is configured at a 45 degree angle to the second light beam 310a to reflect the second light beam 310a from the first mirror 312 to the second optical sensor 112. Both mirrors 506, 508 reflect almost all incident light (e.g., the first and second beams 308a, 310a) 90 degrees, and direct the light beams 308b, 310b toward the optical sensors 110, 112 such that the light beams 308b, 310b incident on the optical sensors 110, 112 are traveling in the opposite direction (e.g., 180 degrees relative to the emitted light 304 generated by the light source 306).

Due to the different locations of the optical sensors 110, 112 relative to the flow tube 104 (compared to the example of FIG. 4), the mirror 506 is oriented at a 90 degree angle compared to the orientation of the mirror 404 of FIG. 4, and the mirror 508 is oriented at a 90 degree angle compared to the orientation of the mirror 406.

While the examples of FIGS. 3-5 include an example implementation of a beam splitter, any type of beam splitter may be used. Example beam splitters that may be used include a cube beam splitter, a plate beam splitter, a pellicle beam splitter, a Wollaston prism, a diffractive beam splitter, an actuated beam splitter, or a fused fiber beam splitter.

Figure 6:
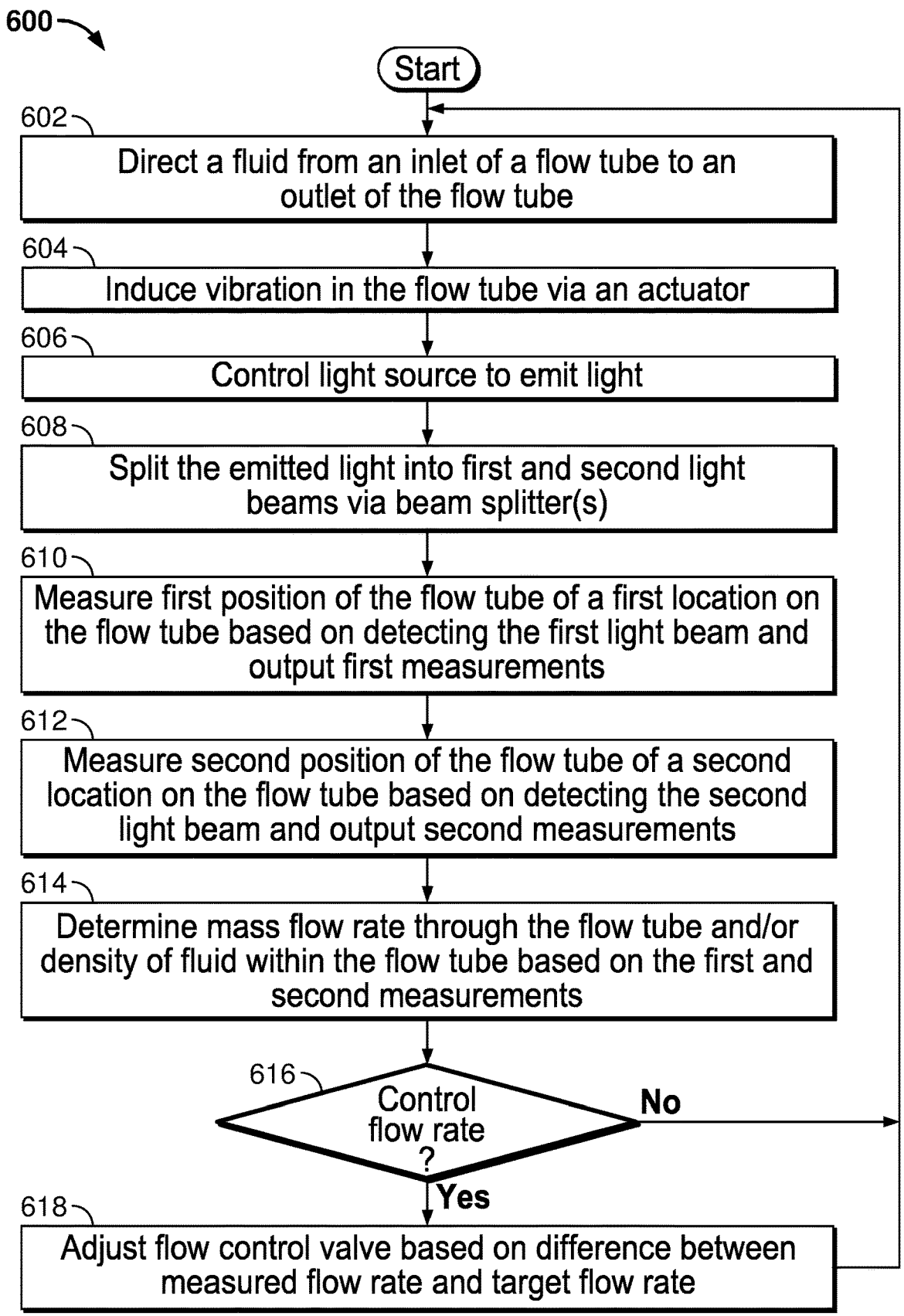
FIG. 6 is a flowchart representative of an example method that may be performed by the mass flow meter/controller of FIG. 2 to measure mass flow and/or fluid density, and/or to control mass flow.

FIG. 6 is a flowchart representative of an example method 600 that may be performed by the mass flow meter/controller 100 of FIGS. 2-5 to measure mass flow and/or fluid density, and/or to control mass flow. The example method 600 will be described with reference to the example mass flow meter/controller 100 of FIGS. 1 and 3. However, the method 600 may be performed using any of the disclosed example mass flow meters/controllers.

At block 602, the flow tube 104 directions a fluid from the inlet of the flow tube 104 to the outlet of the flow tube 104. At block 604, the actuator induces a vibration in the flow tube 104.

At block 606, the control circuitry 122 controls the light source 306 to emit light 304 by controlling the light source controller 208. For example, the control circuitry 122 may enable the light source controller 208 to enable the light source 306. At block 608, one or more beam splitters (e.g., the mirrors 312, 314) split the light 304 emitted by the light source 306 into a first light beam 308 and a second light beam 310.

At block 610, the first optical sensor 110 measures a first position of the first location 118 on the flow tube 104 based on detecting the first light beam 308 or 308b, and outputs the first measurements (e.g., after amplification by the amplifier 210). At block 612, the second optical sensor 112 measures a second position of the second location 120 on the flow tube 104 based on detecting the second light beam 310 or 310b, and outputs the second measurements (e.g., after amplification by the amplifier 212). The first and second measurements may be signals representative of the respective magnitudes of the first and second light beams 308, 308b, 310, 310b received by the optical sensors 110, 112. The magnitudes of the signals may change based on the occlusion of the light beams 308, 308b, 310, 310b by the flow tube 104, which changes as a result of the vibration of the flow tube 104.

At block 614, the control circuitry 122 determines the mass flow rate through the flow tube 104 (e.g., based on a phase difference between the first measurements and the second measurements) and/or determines a density of the fluid within the flow tube 104 (e.g., based on the vibration frequency of the flow tube 104).

At block 616, the control circuitry 122 determines whether the flow rate is to be controlled. For example, a mass flow controller may be configured to control the flow rate, while a mass flow meter omits controlling the flow rate. If the flow rate is to be controlled (block 616), the control circuitry 122 adjusts the flow control valve 124 based on the difference between the measured flow rate and a target flow rate.

After adjusting the flow control valve (block 618), or if the flow control rate is not being controlled (block 616), control returns to block 602 to continue measurement and/or control.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A mass flow meter/controller, comprising:
   a flow tube configured to direct a fluid from an inlet of the flow tube to an outlet of the flow tube;
   an actuator configured to cause a vibration in the flow tube;
   a light source configured to emit light;
   at least one beam splitter configured to split the light emitted by the light source into a first light beam and a second light beam;
   a first optical sensor configured to output first measurements of a first position of a first location on the flow tube based on detecting the first light beam;
   a second optical sensor configured to output second measurements of a second position of a second location on the flow tube based on detecting the second light beam; and
   control circuitry configured to determine at least one of a mass flow rate through the flow tube or a density of the fluid in the flow tube based on the first measurements and the second measurements, wherein the at least one beam splitter is configured to direct the first light beam and the second light beam in opposite directions, the first location on the flow tube and the second location on the flow tube are positioned on opposite sides of the at least one beam splitter, and the first optical sensor and the second optical sensor are positioned on opposite sides of the at least one beam splitter to receive the first light beam and the second light beam, respectively, from the at least one beam splitter.

2. The mass flow meter/controller as defined in claim 1, wherein the at least one beam splitter comprises at least one of a cube beam splitter, a plate beam splitter, a pellicle beam splitter, a Wollaston prism, a diffractive beam splitter, an actuated beam splitter, or a fused fiber beam splitter.

3. The mass flow meter/controller as defined in claim 1, wherein the actuator comprises a driving coil configured to actuate the flow tube via a magnet attached to the flow tube.

4. The mass flow meter/controller as defined in claim 1, further comprising a flow control valve configured to control a flow of the fluid through the flow tube, wherein the control circuitry is configured to control the flow control valve based on the determined mass flow rate.

5. A mass flow meter/controller, comprising:
a flow tube configured to direct a fluid from an inlet of the flow tube to an outlet of the flow tube;
an actuator configured to cause a vibration in the flow tube;
a light source configured to emit light;
at least one beam splitter configured to split the light emitted by the light source into a first light beam and a second light beam, wherein the at least one beam splitter comprises:
a first mirror arranged at substantially a 45 degree angle to the light source to reflect a first portion of the light from the light source to form the first light beam; and
a second mirror arranged to reflect a second portion of light from the light source that passes through the first mirror back toward the first mirror, the first mirror configured to reflect the second portion of the light from the second mirror to form the second light beam;
a first optical sensor configured to output first measurements of a first position of a first location on the flow tube based on detecting the first light beam;
a second optical sensor configured to output second measurements of a second position of a second location on the flow tube based on detecting the second light beam; and
control circuitry configured to determine at least one of a mass flow rate through the flow tube or a density of the fluid in the flow tube based on the first measurements and the second measurements.

6. The mass flow meter/controller as defined in claim 5, wherein the at least one beam splitter further comprises:
a third mirror configured to reflect the first light beam from the first mirror to the first optical sensor; and
a fourth mirror configured to reflect the second light beam from the first mirror to the second optical sensor.

7. The mass flow meter/controller as defined in claim 6, further comprising a printed circuit board, wherein the first optical sensor and the second optical sensor are mounted to the printed circuit board.

8. The mass flow meter/controller as defined in claim 7, wherein the printed circuit board is configured to thermally couple the first optical sensor and the second optical sensor.

9. The mass flow meter/controller as defined in claim 8, wherein the light source is mounted to the printed circuit board and is thermally coupled to the first optical sensor and the second optical sensor.

10. The mass flow meter/controller as defined in claim 6, wherein the first location of the flow tube, the second location of the flow tube, and a portion of the flow tube between the first location and the second location are oriented on a two-dimensional plane, and the actuator is configured to cause the vibration in the flow tube in a direction along the two-dimensional plane.

11. The mass flow meter/controller as defined in claim 5, wherein the first location of the flow tube, the second location of the flow tube, and a portion of the flow tube between the first location and the second location are oriented on a two-dimensional plane, and the actuator is configured to cause the vibration in the flow tube in a direction transverse to the two-dimensional plane.

12. A method, comprising:
directing a fluid from an inlet of a flow tube to an outlet of the flow tube;
causing a vibration in the flow tube via an actuator;
emitting light from a light source;
splitting, via at least one beam splitter, the light emitted by the light source into a first light beam and a second light beam, wherein splitting the light via the at least one beam splitter comprises:
reflecting a first portion of the light from the light source, via a first mirror arranged at substantially a 45 degree angle to the light source, to form the first light beam;
reflecting a second portion of light from the light source that passes through the first mirror back toward the first mirror via a second mirror; and
reflecting the second portion of the light from the light source via the first mirror to form the second light beam;
outputting, via a first optical sensor, first measurements of a first position of a first location on the flow tube based on detecting the first light beam;
outputting, via a second optical sensor, second measurements of a second position of a second location on the flow tube based on detecting the second light beam; and
determining, via control circuitry, at least one of a mass flow rate through the flow tube or a density of the fluid in the flow tube based on the first measurements and the second measurements.

13. The method as defined in claim 12, further comprising directing the first light beam and the second light beam in opposite directions.

14. The method as defined in claim 13, further comprising reflecting the first light beam via the first mirror to the first optical sensor via a second mirror and reflecting the second light beam reflected via the first mirror to the second optical sensor.

15. The method as defined in claim 14, further comprising thermally coupling the first optical sensor and the second optical sensor.

16. The method as defined in claim 15, further comprising thermally coupling the light source to the first optical sensor and the second optical sensor.

17. The method as defined in claim 12, wherein splitting the light comprises splitting the light using at least one of a cube beam splitter, a plate beam splitter, a pellicle beam splitter, a Wollaston prism, a diffractive beam splitter, an actuated beam splitter, or a fused fiber beam splitter.

18. The method as defined in claim 12, wherein causing the vibration in the flow tube comprises actuating the flow tube via a magnet and a driving coil.

* * * * *